Oct. 2, 1956

A. J. WINTER 2,765,459

POSITION DETERMINING DEVICE

Filed July 14, 1952

INVENTOR,
ARTHUR J. WINTER
BY R. E. Geauque
ATTORNEY

Oct. 2, 1956 A. J. WINTER 2,765,459
POSITION DETERMINING DEVICE
Filed July 14, 1952 4 Sheets-Sheet 2

INVENTOR,
ARTHUR J. WINTER
BY R. E. Geangue
ATTORNEY

Oct. 2, 1956 A. J. WINTER 2,765,459
POSITION DETERMINING DEVICE
Filed July 14, 1952 4 Sheets-Sheet 4

INVENTOR,
ARTHUR J. WINTER
BY R. E. Geangue
ATTORNEY

United States Patent Office 2,765,459
Patented Oct. 2, 1956

2,765,459

POSITION DETERMINING DEVICE

Arthur J. Winter, Los Angeles, Calif., assignor to Telecomputing Corporation, Burbank, Calif., a corporation of California Application July 14, 1952, Serial No. 298,876

4 Claims. (Cl. 340—347)

This invention relates to a position determining device and more particularly to an instrument for counting the increments of movement of any element so that the position of the element can be determined at any given time. The movement of the element whose position is to be determined can either be lineal or rotational or a combination of both and the positional information derived from the counting device can be in any suitable functional form as a dependent variable of the movement or position of the element at any given time.

It has heretofore been the practice for some previous position determining devices, used to determine spatial position of a member, to utilize a separate mechanical connection to the counter to impart to the counter the information required to determine the direction of movement. This additional mechanical connection generally imparted undesirable torque loadings on the rotational or moving parts of the counter or the device to which it was connected. In addition, certain lags had to be built into this physical connection to be sure that the directional information preceded the counting information. As a result, position determining instruments such as the one shown in U. S. Patent No. 2,685,082 granted July 27, 1954, Ward W. Beman and Wyche D. Caldwell, have been utilized which eliminate the necessity for this mechanical connection and which utilize out-of-phase light signals to provide both the counting signal and the directional signal. However, it has been found that the results obtained by the use of light signals can be improved upon since the strength and accuracy of the light signals are effected by dispersion and diffusion of the light rays and also objectionable drift in these optical systems has been traced to the photocells used in connection therewith, to ageing exciter lamps, and to inherent drift problems of direct current systems.

In order to have a position determining device with a more stable output, the present invention employs an electromagnetic pickup in association with an electromagnetic field of varying intensity which moves past the pickup during movement of the element which is being followed, or more generally, any relative movement between the pickup device and the variable field generator may be employed. More particularly, the electromagnetic field is produced by current flowing through a conductor which is laid out in a pattern so that adjacent sections of the conductor carry the same electric current in opposite directions and a condition of zero field intensity exists between adjacent conductors due to field cancellation. The conductor can be so shaped that adjacent sections are substantially parallel to each other and connected by segments of the conductor to make the conductor continuous. A suitable electromagnetic pickup can be placed in the electromagnetic field of the conductor so that when it is directly over one of the sections of the conductor the voltage induced in the pickup would be maximum whereas, when it is half way between adjacent sections of the conductor, the voltage induced in the pickup will be minimum since the fields produced by current flowing in opposite directions in adjacent sections of the conductor will cancel each other. By utilizing two such electromagnetic pickups, it is possible to have the position of one of the pickups relative to the conductor offset from the position of the other pickup relative to the conductor and thereby to obtain out-of-phase signals so that both the amount of movement and the directional sense of the movement can be obtained by the utilization of suitable electrical circuits. The conductor is so connected to the element whose position is to be determined that it will follow all movements of the element and the electromagnetic field developed by the conductor will move past the pickups to induce both counting and directional signals in the pickups.

It is, therefore, an object of this invention to provide a detecting device which will convert mechanical motion of a primary member into electrical signals through the mechanical movement of an electromagnetic field connected thereto, whose magnitude is cyclic in nature, periodically varying in intensity as a function of its location on the primary member, relative to a secondary member which is an electromagnetic pickup.

A further object of the invention is the provision whereby an electromagnetic field of varying intensity can be developed by a single conductor having sections so arranged that the electromagnetic field of the sections tend to cancel each other.

A still further object of the invention is to provide an electromagnetic field of varying intensity which moves in accordance with the position of any element and which produces signals in electromagnetic pickups associated with the moving electromagnetic field during its movement.

Another object of the invention is the provision of two or more electromagnetic pickups offset from one another in relation to an electromagnetic field of varying intensity so that upon movement of the electromagnetic field, out-of-phase signals will be developed from which the amount of movement and direction of movement of the field can be determined.

These and other objects of the invention not specifically enumerated above will be apparent from the following specification and drawings in which.

Figure 1:
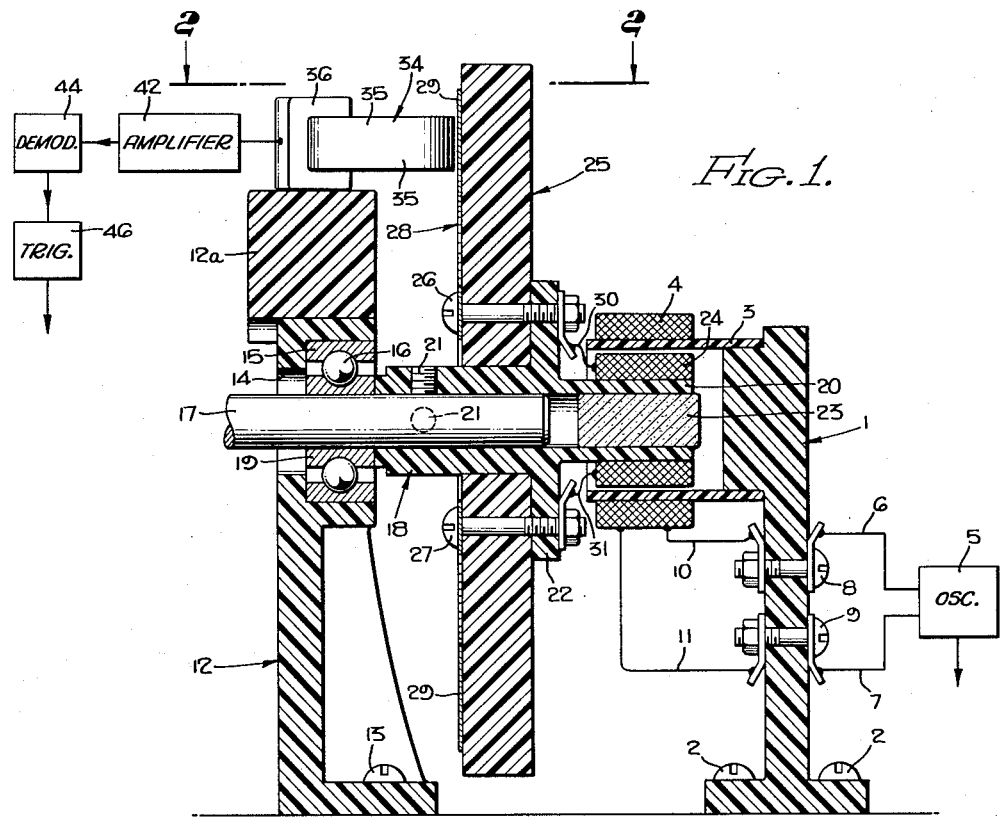
Figure 1 is a sectional view in elevation of one embodiment of the invention illustrating the mounting for two electromagnetic pickups and for the conductor producing the electromagnetic field.

An embodiment of the present invention is illustrated in Figure 1 wherein a standard 1 supports a cylinder 3 projecting to one side of the standard. The standard 1 can be secured to the platform for mounting the position determining device by means of screws 2. A coil 4 is mounted around the outer circumference of cylinder 3 and is supplied with a high frequency alternating current from oscillator 5. Leads 6 and 7 connect the oscillator with lugs on bolts 8 and 9 respectively. These bolts pass through standard 1 and have lugs connecting with leads 10 and 11 of coil 4. The coil 4 is stationary and the bolts 8 and 9 serve as conductors through the standard 1. The standard 1 and cylinder 3 are fabricated from any suitable insulating material so as not to interfere with the electrical circuit.

A second standard 12 is secured to the mounting for the position determining device by means of screws 13 and has an opening 14 for receiving the outer race 15 for ball bearings 16. A shaft 17 projects through the opening 14 and carries a member 18, the shaft being supported by an inner race 19 for ball bearings 16. The member 18 is slipped on to the end of shaft 17 so that a cylindrical portion 20 of the member 18 projects beyond the end of the shaft 17. The member 18 is secured to the shaft by set screws 21 and has a disk section 22 projecting therefrom. An iron core 23 is inserted in the portion 20 and a circular winding 24 is mounted around the outside of portion 20 so that it is positioned in line with winding 4 which is mounted by cylinder 3.

Figure 3:
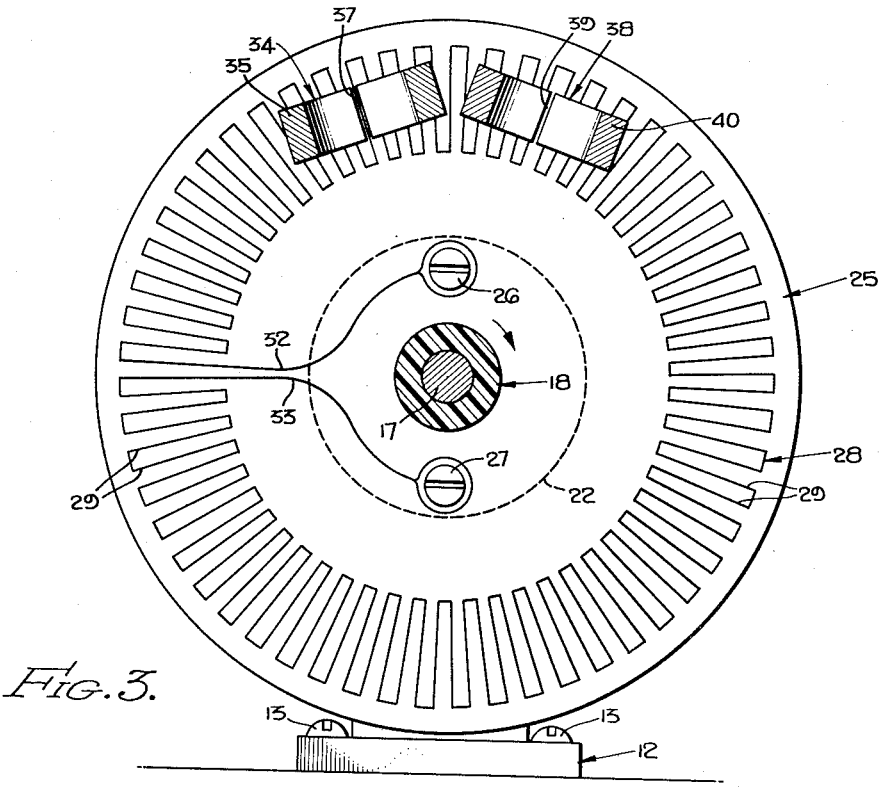
Figure 3 is a vertical plan view of the conductor taken along line 3—3 of Figure 2 and illustrating the pickups in cross section.

A primary member, namely circular disk 25, is mounted on member 18 and secured to disk section 22 by screws 26 and 27. As illustrated in Figure 3, the face of disk 25 carries a conductor 28 which is in the form of equally spaced, radial sections 29 with adjacent sections being connected together alternately at opposite ends. Thus, the conductor is made continuous and current is made to flow in opposite directions in adjacent sections. The winding 24 is connected by leads 30 and 31 to lugs on bolts 26 and 27, respectively, which bolts pass through both projecting disk 22 and disk 25. Leads 32 and 33 likewise connect with bolts 26 and 27 respectively and with the ends of conductor 28 to complete the circuit with winding 24. The number of sections 29 disposed around the disk 25 can, of course, be varied, but by making the number of sections as large as possible, the sensitivity of detection can be correspondingly increased. It has been found that by the use of a photo engraving process, an extremely large number of sections 29 can be placed around the disk 25.

In operation, the shaft 17 is connected to the element whose movement is to be followed so that movements of the element will cause rotation of the disk 25 and the sections 29 mounted thereon. Likewise, winding 24 will rotate with disk 25 relative to winding 4 and thus the output of the oscillator can be continually imparted to the conductor 28 without the use of slip rings. The number of turns in both windings 4 and 24 can be varied to match the impedance of the circuits for both windings. Also, core 23 can be eliminated leaving only an air gap between the two windings without appreciably affecting the transfer between the windings. The standard 12, member 18 and disk 25 are all made of insulating material so as to be non-conductive and the disk 25 is made as light as possible to reduce the inertia thereof.

Referring to Figure 3, since the high frequency current flows in opposite directions in adjacent sections 29, it is obvious that the intensity of the electromagnetic field produced around the circumference of the disk will vary from a maximum to a minimum and back to a maximum over the space between two adjacent sections. At a point half way between two sections the field will be minimum since the fields from adjacent sections will cancel each other because the fields are opposed. In a similar manner, the field directly over a section will be maximum since the field of the adjacent conductors will have minimum effect.

Figure 2:
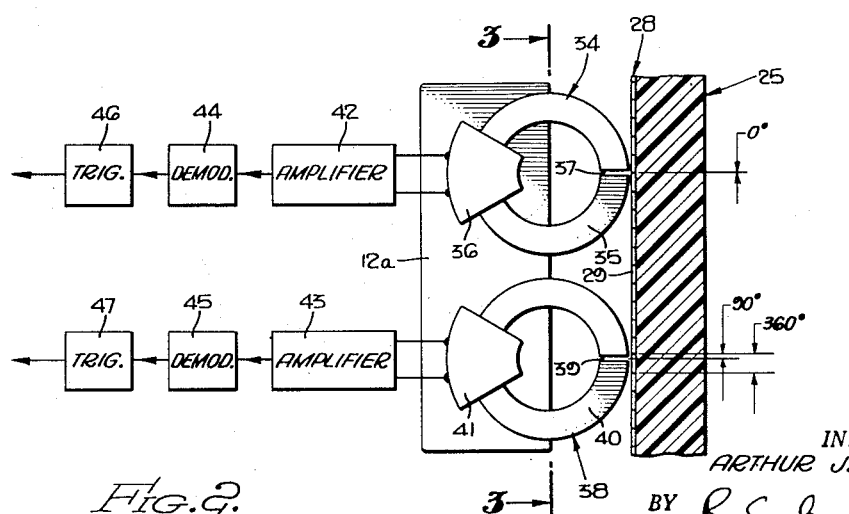
Figure 2 is a horizontal sectional view taken along line 2—2 of Figure 1 showing the relative position of the two pickups with respect to the conductor.

In order to obtain continuous readings of the intensity of the electromagnetic field produced by conductor 28, an electromagnetic pickup 34 is mounted on section 12a of stationary standard 12. The pickup 34 can be of the air gap type having a core 35, winding 36 and air gap 37. The air gap is positioned as closely as possible to conductor 28 so that it will be able to pick up the field from a single section 29 with a minimum of stray pickup from adjacent sections. In order to obtain signals which are out-of-phase with those derived from pickup 34, a second pickup 38 is likewise mounted on standard 12 and has an air gap 39, a core 40 and a winding 41, with the air gap likewise positioned closely adjacent to conductor 28. As illustrated in Figure 2, the air gap 39 of the pickup 38 is offset from one of the sections 29 by one-quarter of the distance to the next adjacent section at the time that air gap 37 of pickup 35 is directly over one of sections 29. Since the field intensity of the conductor 28 passes through a complete cycle over the distance between adjacent sections, this distance is represented as 360 degrees of movement and when the disk 25 rotates in the direction illustrated by the arrow, the air gap 37 will lead the air gap 39 by 90 degrees. Thus, the output of winding 36 will lead the output of winding 41. The outputs of windings 36 and 41 are amplified by amplifiers 42 and 43 respectively, and the envelopes of these high frequency outputs from amplifiers 42 and 43 are then obtained by demodulators 44 and 45 respectively. These envelopes are utilized to operate the triggers 46 and 47 which form elements of any suitable type of counting circuit such as the one illustrated in U. S. Patent No. 2,685,082 granted July 27, 1954, to Ward W. Beman and Wyche D. Caldwell.

Figure 4:
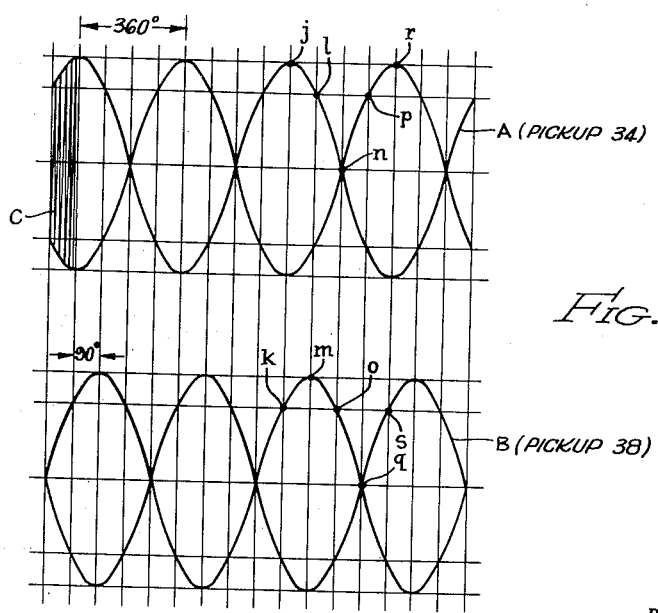
Figure 4 illustrates the envelopes of the wave forms which are developed by the pickups when positioned as illustrated in Figure 3.

The demodulated output of pickups 34 and 38, resulting from rotation of conductor 28, are illustrated by curves A and B of Figure 4 respectively and the high frequency output from winding 36 is illustrated by curve C. It is noted that these curves pass through a complete cycle when the disk 25 rotates through the angular distance between adjacent sections 29, this distance being illustrated as 360 degrees of rotation. When pickup 34 is located directly over one of the sections 29 as shown in Figure 3, its output is maximum as illustrated at point "j" on curve A. At the same time, the air gap 39 of pickup 38 is displaced 90 degrees from the section 29 which it is approaching and the intensity of the field in this position is designated by point "k" on curve B. After the disk 25 rotates 90 degrees in a clockwise direction as illustrated by the arrow in Figure 3, the output of pickup 34 is illustrated by point "l" on curve A while the output of pickup 38 is illustrated by point "m" on curve B. Since air gap 39 is then positioned over a section 29, the output of pickup 38 becomes maximum. When the disk 25 has been rotated 180 degrees from its original position in Figure 3 so that the air gap 37 is half way between adjacent sections 29, the output of pickup 34 will be minimum as illustrated by point "n" on curve A. At the same time the air gap 39 will be moved 90 degrees away from a section 29 and the output of pickup 38 is illustrated by point "o" on curve B. If the disk 25 is moved another 90 degrees, or a total of 270 degrees, the gap 37 will be positioned 90 degrees away from the section 29 which it is approaching and the output of pickup 34 will be indicated by point "p" on curve A while the output of pickup 38 will be indicated by point "q" on curve B. After 360 degrees of rotation of disk 25, the output of pickup 34 will again be maximum as illustrated by point "r" on curve A and the output of pickup 38 is then illustrated at point "s" on curve B. Thus, it is seen that curve A will lead curve B by 90 degrees when disk 25 is rotated in a clockwise direction as illustrated in Figure 3. Of course, if the direction of rotation of disk 25 is reversed so as to be counterclockwise, then the output of pickup 34 will lag the output of pickup 38 by 90 degrees.

Figure 5:
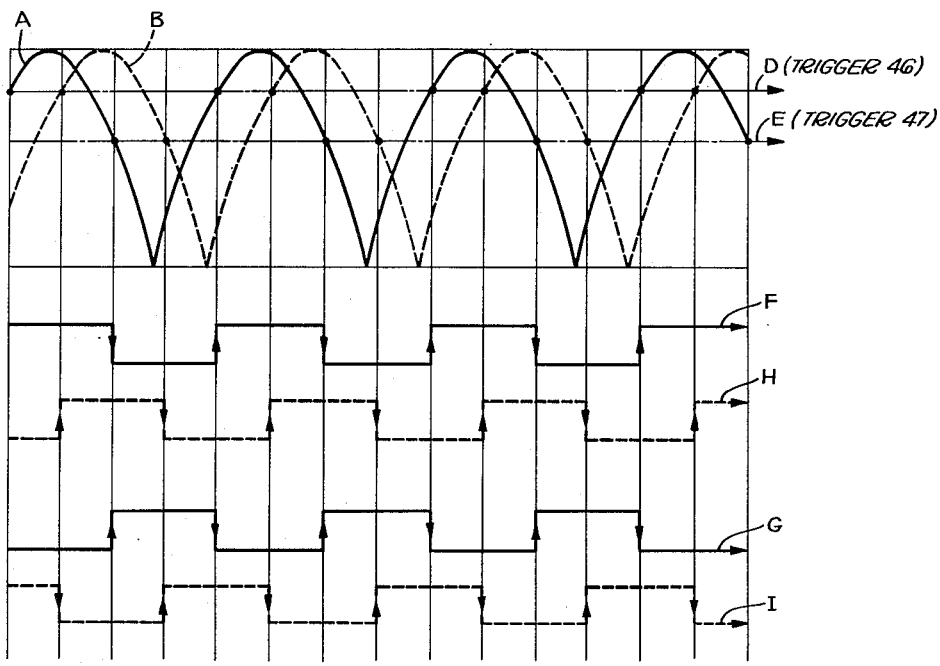
Figure 5 illustrates the output of the trigger tubes which are connected to each of the pickups and also the position of the trigger levels in relation to the output curves of the pickups.

Only the upper half of the envelope of curves A and B are needed in the operation of triggers 46 and 47 and these sections of the envelopes are shown superimposed upon one another in Figure 5. Also, the trigger levels for the tubes of triggers 46 and 47 are illustrated by the lines D and E on the curves of Figure 5. Each trigger is of the standard flip-flop type containing two electron tubes, one of which is controlled by the voltage output of the demodulator to which it is directly connected, while the other tube is controlled by the conduction of the connected tube. As the output of demodulator 44 passes through the trigger levels D and E, the tube of trigger 46 which is directly connected to demodulator 44 will develop electrical pulses and voltage levels in the manner illustrated by curve F of Figure 5 while the other tube of the trigger will develop pulses and voltage levels in the manner illustrated by curve G. It is noted that when curve F shows a positive going pulse, curve G shows a negative going pulse, and when the curve F has a high voltage level, curve G has a low voltage level. In a like manner, the tube of trigger 47 which is directly connected to demodulator 45 will be conducting in the manner illustrated by curve H while the other tube of trigger 47 will be conducting in the manner shown by curve I. These pulses and high and low potential levels developed by the tubes of triggers 46 and 47 are transmitted to any suitable counting circuit in order to record information as to movement and direction of movement of the element being followed.

Figure 6:
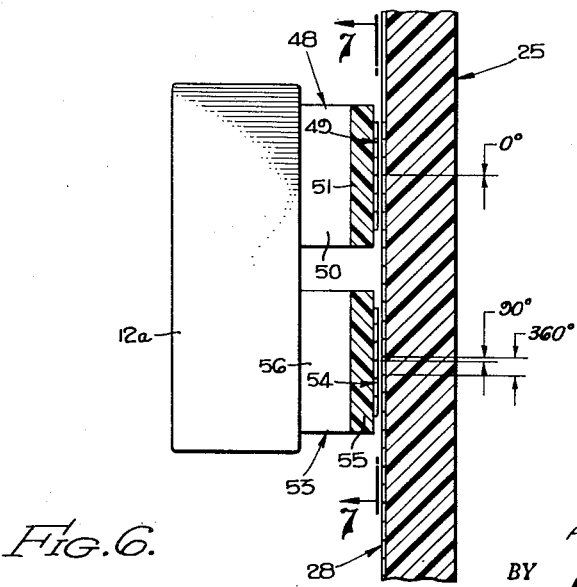
Figure 6 illustrates another embodiment of the invention wherein the pickups are comprised of conductors which are similar in shape to the conductor producing the electromagnetic field and illustrates the manner in which the conductors of the pickups are offset from one another.
Figure 7:
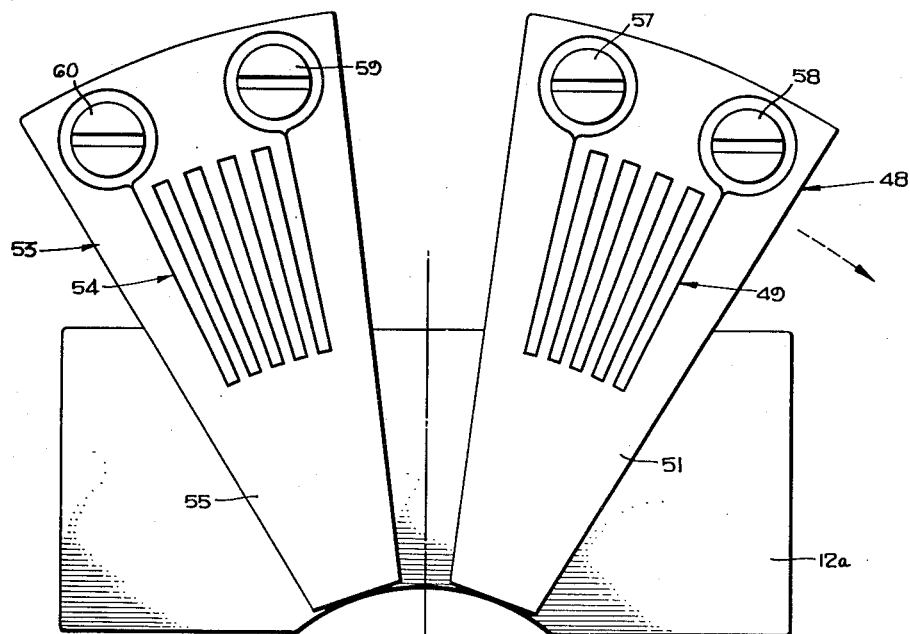
Figure 7 is a vertical plan view taken along lines 7—7 of Figure 6 illustrating the mounting for the conductors forming the pickups.

A modification of the pickups which cooperate with the conductor 28 is illustrated in Figures 6 and 7. One of the pickups 48 is formed as a conductor 49 which is identical in shape, size and dimensions with a segment of conductor 28. This conductor is mounted on an insulated face section 51 of member 50 which is secured to section 12a of standard 12. A second pickup 53 is composed of conductor 54 which is likewise in the form and shape of a segment of conductor 28. Conductor 54 is mounted on an insulated face 55 of member 56 which is supported by section 12a of standard 12. The conductor 49 connects with terminals 57 and 58 in member 50 which lead to amplifier 42, while the conductor 54 connects with terminals 59 and 60 in member 56 which lead to amplifier 43. Both pickup conductors 49 and 54 are positioned closely adjacent the conductor 28 so that they will be in the electromagnetic field of conductor 28, and, as illustrated in Figure 6, the position of conductor 54 is offset 90 degrees from the position of conductor 49 relative to conductor 28 in order to provide out-of-phase signals from the pickups. With the pickups in the position shown in Figure 6, conductor 49 will develop a maximum output since it is positioned directly opposite segments of conductor 28 whereas conductor 54 will develop an output between maximum and minimum since it is displaced 90 degrees from segments of conductor 28. By utilizing this type of pickup, it is possible to obtain the average field of segments of conductor 28 since each of the pickups is influenced by a considerable length of the conductor 28. Also, by increasing the length of the pickup conductors, the output from the pickups can be increased since they will be subjected to a greater length of conductor 28. The demodulated output curves of conductors 49 and 54, developed by rotation of disk 25, will be identical with curve A and curve B, respectively, of Figure 5 and these outputs can be utilized in the counting circuit in the manner previously described.

Figure 8:
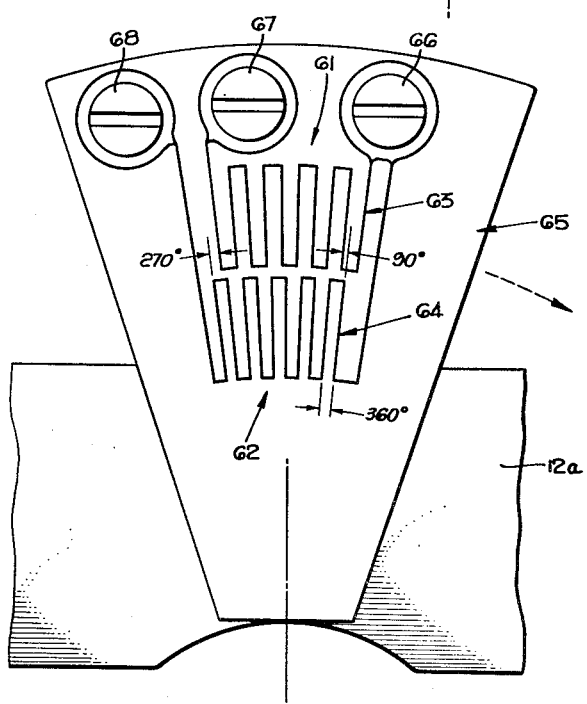
Figure 8 illustrates another modification of the invention wherein separate offset conductor patterns, having sections one-half of the length of the conductor sections, are utilized as pickups and are positioned adjacent each other on a single mounting.

Another modification of the pickups used in connection with this invention is illustrated in Figure 8. The pickups 61 and 62 are comprised of conductors 63 and 64 respectively which are mounted on a member 65 which is carried by section 12a of standard 12. The conductors 63 and 64 are identical in shape with conductor 28 except for the fact that each conductor is approximately one-half of the radial length of conductor 28 so that both conductors can be positioned opposite a single segment of conductor 28, with conductor 63 positioned above conductor 64. The conductor 64 is offset 90 degrees from conductor 63 as illustrated in Figure 8 in order to obtain out-of-phase signals for use in the counter circuit. Conductor 63 is connected to terminals 66 and 67 which lead to amplifier 42 while conductor 64 is connected to terminals 66 and 68 which lead to amplifier 43. The output of the amplifiers connected to conductors 63 and 64 will be similar to curves A and B illustrated in Figure 5 and by positioning the pickups one above the other, the electromagnetic field of a single segment of the conductor 28 will develop the counting signals. This permits a reduction in size of the pickups and simplifies the electrical connections to the pickups.

Various modifications of this invention are contemplated since it is obvious that the conductor 28 can be mounted on a cylinder or tape or in other ways without affecting the magnetic field produced thereby. Also, the shape of the conductor 28 can be varied as long as adjacent sections of the conductor are so positioned to have current flowing in opposite directions to produce fields which tend to cancel one another. The current supplied to the conductor 28 can be either direct current or alternating current of a wide range of frequencies since all that is necessary is to produce electromagnetic fields around the sections of conductor 28. Of course, the use of high frequency alternating current to produce the electromagnetic field has the advantage that very slow movement of the primary member may be followed and positional information is not lost when the member comes to a standstill since the amplitude of pickup is a function of position and is little affected by speed of rotation. In addition, the signals developed by the detector device of this invention can be used in any type of an electronic circuit which will give the desired results based on the information obtained from the detector device. It is obvious that the electromagnetic field may be produced by means other than a continuous conductor. The conductor may be constructed of individual segments so connected that the resultant field is the same as described previously. The segments could be connected in series, parallel, or some combination of series-parallel, and still be used to create the desired electromagnetic field. Various other modifications are contemplated and may obviously be resorted to by those skilled in the art without departing from the spirit and scope of the invention, as hereinafter defined by the appended claims.

What is claimed is:

1. A position determining device including a rotor portion and a stator portion, said rotor portion including a bi-directionally rotatable shaft, a disc carried by said shaft and movable therewith, a conductor mounted on said disc and folded to have adjacent, radial sections disposed at substantially equal angular increments about said shaft, one end of each of said sections being connected to the adjacent end of the next preceding section and the opposite end of each section being connected to the adjacent end of the next succeeding section, except in a single instance where the adjacent sections are non-interconnected and are adapted for the application of electrical voltages therebetween, a pair of voltage input terminals supported from said stator, a transformer including primary and secondary windings, said primary winding being supported from said stator portion, said secondary winding being carried by said rotor portion in inductively coupled relation to said primary winding but mechanically free thereof, said primary winding being coupled to said input terminals, said secondary winding being coupled to said folded conductor at said adjacent non-interconnected sections for producing current flow in said conductor which is in opposition in adjacent sections, first and second electro-magnetic pick-up means supported from said stator portion and positioned adjacent said conductor on said rotor to continuously detect variations in the field of said conductor as said rotor turns, said pick-up means being offset from one another and with respect to the configuration of said conductor by a distance equal to one-fourth of the separation between adjacent radial sections of the said conductor to provide continuous out-of-phase signals upon motion of said rotor portion.

2. A position determining device according to claim 1 wherein said first and second pick-up means each comprises a conductor identical in shape to a segment of said first mentioned conductor except that the adjacent sections of the conductors in said pick-up means are approximately one-half the length of the adjacent sections of said first mentioned conductor, the conductors of said first and second pick-up means being positioned adjacent each other along a radial section of said disc.

3. A position determining device as defined in claim 1 wherein said first and second pickup means are each comprised of a core having an air gap between its two ends and a winding positioned around said core, the air gaps of said first and second pickup means being positioned closely adjacent said conductor.

4. A position determining device as defined in claim 1 wherein said first and second pickup means are each comprised of a conductor identical in shape to a segment of said first mentioned conductor, the conductors of said first and second pickup means being positioned closely adjacent said first mentioned conductor.

References Cited in the file of this patent

UNITED STATES PATENTS

| | | |
|---|---|---|
| 2,313,682 | Stuart | Mar. 9, 1943 |
| 2,403,889 | Di Toro | July 9, 1946 |
| 2,519,725 | White | Aug. 22, 1950 |
| 2,540,654 | Cohen et al. | Feb. 6, 1951 |
| 2,650,352 | Childs | Aug. 25, 1953 |
| 2,656,106 | Stabler | Oct. 20, 1953 |